US012500961B2

(12) United States Patent
Ramasubramanian et al.

(10) Patent No.: US 12,500,961 B2
(45) Date of Patent: Dec. 16, 2025

(54) MULTIZONE MIGRATION SERVICES

(71) Applicant: Box, Inc., Redwood City, CA (US)

(72) Inventors: Sathish Ramasubramanian, Sunnyvale, CA (US); Anna Esther Min, Emeryville, CA (US); Kevin Greenan, Santa Cruz, CA (US)

(73) Assignee: Box, Inc., Redwood City, CA (US)

( * ) Notice: Subject to any disclaimer, the term of this patent is extended or adjusted under 35 U.S.C. 154(b) by 215 days.

(21) Appl. No.: 16/511,673

(22) Filed: Jul. 15, 2019

(65) Prior Publication Data

US 2020/0028909 A1   Jan. 23, 2020

Related U.S. Application Data

(60) Provisional application No. 62/699,067, filed on Jul. 17, 2018.

(51) Int. Cl.
| | |
|---|---|
| *H04L 67/52* | (2022.01) |
| *G06F 3/06* | (2006.01) |
| *G06F 16/21* | (2019.01) |
| *G06F 16/29* | (2019.01) |
| *G06F 16/387* | (2019.01) |
| *H04L 43/062* | (2022.01) |
| *H04L 67/1097* | (2022.01) |

(52) U.S. Cl.
CPC ............ *H04L 67/52* (2022.05); *G06F 3/0647* (2013.01); *G06F 16/214* (2019.01); *G06F 16/29* (2019.01); *G06F 16/387* (2019.01); *H04L 43/062* (2013.01); *H04L 67/1097* (2013.01)

(58) Field of Classification Search
CPC ... H04L 67/1097; H04L 67/52; G06F 3/0647; G06F 2009/4557; G06F 16/214; G06F 16/185; G06F 16/29; G06F 16/387
See application file for complete search history.

(56) References Cited

U.S. PATENT DOCUMENTS

| | | | | |
|---|---|---|---|---|
| 10,540,388 | B1 * | 1/2020 | Alexander | .............. H04L 67/52 |
| 10,592,154 | B1 * | 3/2020 | LeCrone | ............... G06F 3/0604 |
| 11,461,123 | B1 * | 10/2022 | Tsai | ..................... G06F 9/45558 |
| 2002/0052884 | A1 * | 5/2002 | Farber | ..................... G06F 16/13 |
| 2009/0249005 | A1 * | 10/2009 | Bender | ............... G06F 11/1469 |
| | | | | 711/162 |
| 2012/0173486 | A1 * | 7/2012 | Park | .................... H04L 67/1095 |
| | | | | 707/634 |
| 2013/0144978 | A1 * | 6/2013 | Jain | ........................ H04W 4/02 |
| | | | | 709/219 |

(Continued)

OTHER PUBLICATIONS

A. Marin, C. Dobre, D. Popescu and V. Cristea, "E-System for Automatic Data Migration," 2010 12th International Symposium on Symbolic and Numeric Algorithms for Scientific Computing, Timisoara, Romania, 2010, pp. 479-484, doi: 10.1109/SYNASC.2010.14. (Year: 2010).*

*Primary Examiner* — Gregory Todd
(74) *Attorney, Agent, or Firm* — Sheridan Ross P.C.

(57) ABSTRACT

Embodiments of the disclosure provide systems and methods for migrating cloud-based content between storage locations while maintaining availability of the content being migrated. Embodiments described herein allow data undergoing migration, even data that is inflight, to be accessed, edited, copied, moved, and/or deleted without downtime, blackout periods, or other restrictions.

20 Claims, 7 Drawing Sheets

(56) References Cited

U.S. PATENT DOCUMENTS

| | | | |
|---|---|---|---|
| 2013/0173546 A1* | 7/2013 | Cline | G06F 16/27 |
| | | | 707/638 |
| 2014/0006354 A1* | 1/2014 | Parkison | G06F 3/0635 |
| | | | 707/661 |
| 2016/0062786 A1* | 3/2016 | Meng | H04L 67/32 |
| | | | 718/1 |
| 2017/0262461 A1* | 9/2017 | Androulaki | G06F 16/28 |
| 2018/0121129 A1* | 5/2018 | Sawhney | G06F 3/0685 |
| 2018/0132066 A1* | 5/2018 | Carini | H04L 67/535 |
| 2018/0246886 A1* | 8/2018 | Dragomirescu | G06F 16/2379 |
| 2019/0340003 A1* | 11/2019 | Ramanathan | G06F 9/5077 |
| 2019/0384519 A1* | 12/2019 | Danilov | G06F 3/064 |
| 2020/0387320 A1* | 12/2020 | Ning | H04L 69/329 |

* cited by examiner

MULTIZONE MIGRATION SERVICES

CROSS REFERENCE TO RELATED APPLICATION

The present application claims the benefits of and priority, under 35 U.S.C. § 119(e), to U.S. Provisional Application No. 62/699,067 filed Jul. 17, 2018 by Ramasubramanian et al and entitled "Multizone Migration Services" of which the entire disclosure is incorporated herein by reference for all purposes.

FIELD OF THE DISCLOSURE

Embodiments of the present disclosure relate generally to methods and systems for migrating cloud-based content and more particularly to migrating cloud-based content between storage locations while maintaining availability of the content being migrated.

BACKGROUND

Content such as files, database, etc. stored on a server or "in the cloud" occasionally needs to be migrated to different servers at different locations for various reasons. Current services for providing such migration require or result in some amount of time during which the content being migrated is unavailable and cannot be accessed. When migrating a large volume of content, this period can be significant. Hence, there is a need for improved methods and systems for migrating cloud-based content.

BRIEF SUMMARY

Embodiments of the disclosure provide systems and methods for migrating cloud-based content between storage locations while maintaining availability of the content being migrated. Embodiments described herein allow files undergoing migration, even those that are inflight, to be accessed, edited, copied, moved, and/or deleted without downtime, blackout periods, or other restrictions. According to one embodiment, a method for migrating data between a plurality of storage locations can comprise detecting, by a processor of a cloud-based storage service, initiation of migration of a set of data from an origin location of the plurality of storage locations to a destination location of the plurality of storage locations and identifying, by the processor of the cloud-based storage service, the set of data based on an owner identifier (ID) for the set of data. The owner ID can uniquely identify an owner of data in the set of data and can be stored in a record associated with the set of data which is in turn stored in a table comprising a plurality of records. Each record in the table can uniquely identify and point to data stored in each of the plurality of storage locations.

A generated unique identifier for the set of data can be created by the processor of the cloud-based storage service. The generated unique identifier can be associated with a pointer to the destination location which can map the generated unique identifier for the set of data to the destination location. The record associated with the set of data and stored in the table can also be remapped by the processor of the cloud-based storage service to the generated unique identifier. The set of data can then be copied, by the processor of the cloud-based storage service, from the origin location to the destination location, while maintaining availability of the set of data by the cloud-based storage service.

For example, during the migration, access of the set of data can be detected by the processor of the cloud-based storage service. The processor of the cloud-based storage service can make the set of data available while migration is ongoing using the generated unique identifier and remapped record associated with the set of data and which still points to the origin location of the set of data. Upon completion of copying the set of data from the origin location to the destination location, the record associated with the set of data and stored in the table can be updated to point to the destination location based on the pointer to the destination location associated with the generated unique identifier.

In some cases, a change to the set of data can be detected during migration. In response to detecting the change, a new version ID can be created for the set of data in the record associated with the set of data and stored in the table. Changes made to the set of data can be saved at the destination location for the migration using the new version ID.

In other cases, a deletion of the set of data can be detected during migration. In response to detecting the deletion, a status of the set of data in the record associated with the set of data and stored in the table can be changed and the migration of the content of the set of data to the destination location can continue.

In yet other cases, a copying of the set of data can be detected during migration. In response to detecting the copying, a new generated unique identifier can be created for the copy of the set of data and the new generated unique identifier to point can be mapped to a destination location for the copy of the set of data. A destination set of data can be created at the destination location of the copy of the set of data using the set of data and the generated new unique identifier for the copy of the set of data can be mapped to a record stored in the table and associated with the copy of the set of data.

In still other cases, a move of the set of data can be detected during migration. In response to detecting the move, a new generated unique identifier for the move of the set of data can be created and the new generated unique identifier can be mapped to point to a destination location of the move of the set of data. A destination set of data can be created at the destination location using the set of data and the generated new unique identifier for the move of the set of data can be mapped to a record stored in the table and associated with the copy of the set of data. The set of data at the origin location can then be deleted.

According to another embodiment, a system can comprise a processor and a memory coupled with and readable by the processor. The memory can store therein a set of instructions which, when executed by the processor, causes the processor to migrate data between a plurality of storage locations by detecting initiation of migration of a set of data from an origin location of the plurality of storage locations of a cloud-based storage service to a destination location of the plurality of storage locations and identifying the set of data based on an owner identifier (ID) for the set of data. The owner ID can uniquely identify an owner of data in the set of data and stored in a record associated with the set of data and stored in a table comprising a plurality of records, each record uniquely identifying and pointing to data stored in each of the plurality of storage locations. The instructions cause the processor to create a generated unique identifier for the set of data, the generated unique identifier associated with a pointer to the destination location, map the generated unique identifier for the set of data to the destination location, remap the record associated with the set of data and stored in the table to the generated unique identifier, and copy the set of data from the origin location to the destination location, while maintaining availability of the set of data by the cloud-based storage service.

The instructions can further cause the processor to detect, during the migration, access of the set of data and make the set of data available while migration is ongoing using the generated unique identifier and remapped record associated with the set of data and which still points to the origin location of the set of data. The instructions can further cause the processor to, upon completion of copying the set of data from the origin location to the destination location, update the record associated with the set of data and stored in the table to point to the destination location based on the pointer to the destination location associated with the generated unique identifier.

In some cases, the instructions can further cause the processor to detect a change to the set of data during migration and, in response to detecting the change, create a new version ID for the set of data in the record associated with the set of data and stored in the table and save changes made to the set of data at the destination location for the migration using the new version ID.

In other cases, the instructions can further cause the processor to detect a deletion of the set of data during migration and, in response to detecting the deletion, change a status of the set of data in the record associated with the set of data and stored in the table and continue the migration of the content of the set of data to the destination location.

In yet other cases, the instructions can further cause the processor to detect a copying of the set of data during migration and, in response to detecting the copying, create a new generated unique identifier for the copy of the set of data, map the new generated unique identifier to point to a destination location for the copy of the set of data, create a destination set of data at the destination location of the copy of the set of data using the set of data, and map the generated new unique identifier for the copy of the set of data to a record stored in the table and associated with the copy of the set of data.

In still other cases, the instructions can further cause the processor to detect a move of the set of data during migration and, in response to detecting the move, create a new generated unique identifier for the move of the set of data, map the new generated unique identifier to point to a destination location of the move of the set of data, create a destination set of data at the destination location using the set of data, map the generated new unique identifier for the move of the set of data to a record stored in the table and associated with the copy of the set of data, and delete the set of data at the origin location.

According to yet another embodiment, a non-transitory, computer-readable medium comprising a set of instructions stored therein which, when executed by a processor, causes the processor to migrate data between a plurality of storage locations by detecting initiation of migration of a set of data from an origin location of the plurality of storage locations of a cloud-based storage service to a destination location of the plurality of storage locations and identifying the set of data based on an owner identifier (ID) for the set of data. The owner ID can uniquely identify an owner of data in the set of data and stored in a record associated with the set of data and stored in a table comprising a plurality of records, each record uniquely identifying and pointing to data stored in each of the plurality of storage locations. The instructions cause the processor to create a generated unique identifier for the set of data, the generated unique identifier associated with a pointer to the destination location, map the generated unique identifier for the set of data to the destination location, remap the record associated with the set of data and stored in the table to the generated unique identifier, and copy the set of data from the origin location to the destination location, while maintaining availability of the set of data by the cloud-based storage service.

The instructions can further cause the processor to detect, during the migration, access of the set of data and make the set of data available while migration is ongoing using the generated unique identifier and remapped record associated with the set of data and which still points to the origin location of the set of data. The instructions can further cause the processor to, upon completion of copying the set of data from the origin location to the destination location, update the record associated with the set of data and stored in the table to point to the destination location based on the pointer to the destination location associated with the generated unique identifier.

In some cases, the instructions can further cause the processor to detect a change to the set of data during migration and, in response to detecting the change, create a new version ID for the set of data in the record associated with the set of data and stored in the table and save changes made to the set of data at the destination location for the migration using the new version ID.

In other cases, the instructions can further cause the processor to detect a deletion of the set of data during migration and, in response to detecting the deletion, change a status of the set of data in the record associated with the set of data and stored in the table and continue the migration of the content of the set of data to the destination location.

In yet other cases, the instructions can further cause the processor to detect a copying of the set of data during migration and, in response to detecting the copying, create a new generated unique identifier for the copy of the set of data, map the new generated unique identifier to point to a destination location for the copy of the set of data, create a destination set of data at the destination location of the copy of the set of data using the set of data, and map the generated new unique identifier for the copy of the set of data to a record stored in the table and associated with the copy of the set of data.

In still other cases, the instructions can further cause the processor to detect a move of the set of data during migration and, in response to detecting the move, create a new generated unique identifier for the move of the set of data, map the new generated unique identifier to point to a destination location of the move of the set of data, create a destination set of data at the destination location using the set of data, map the generated new unique identifier for the move of the set of data to a record stored in the table and associated with the copy of the set of data, and delete the set of data at the origin location.

Figure 1:
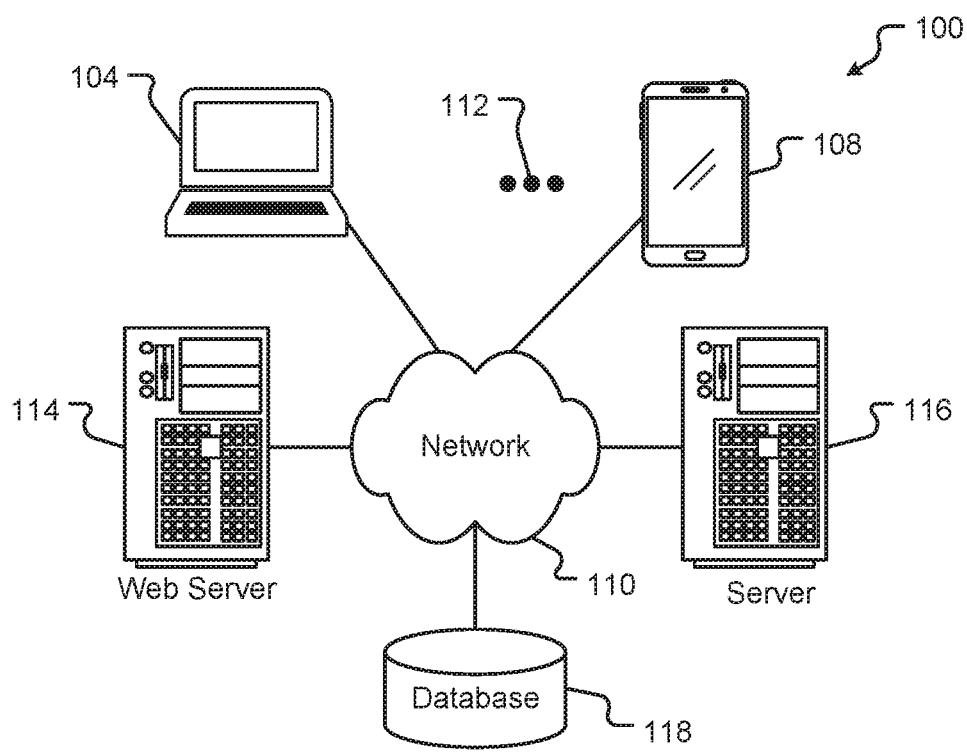
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation SIP, TCP/IP, SNA, IPX, Apple-Talk, and the like. Merely by way of example, the network 110 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
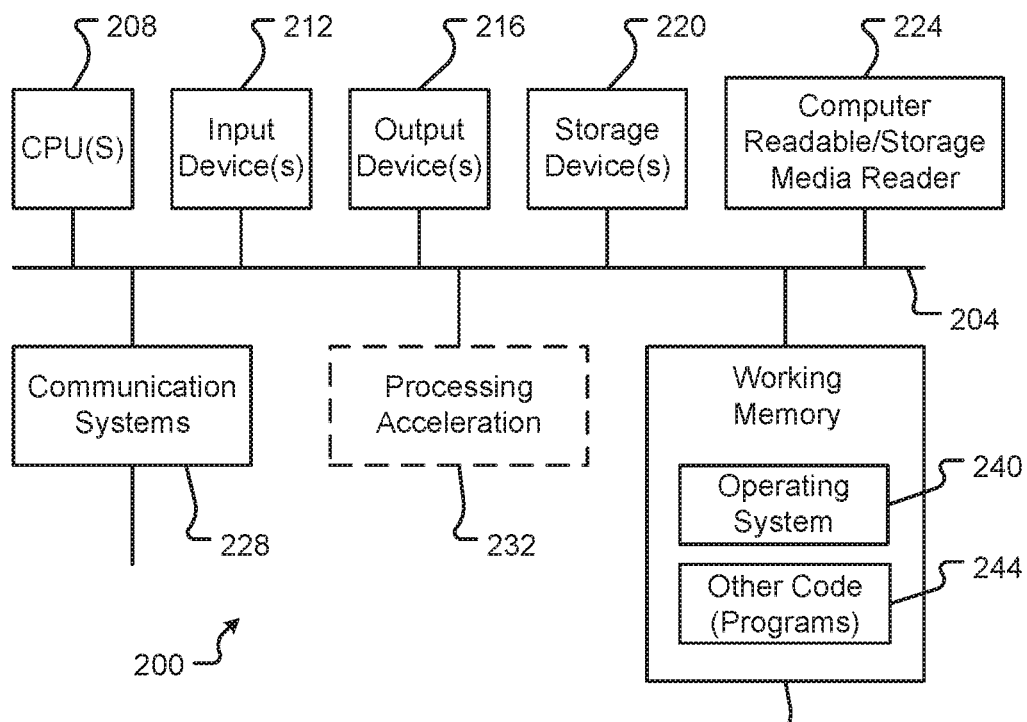
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
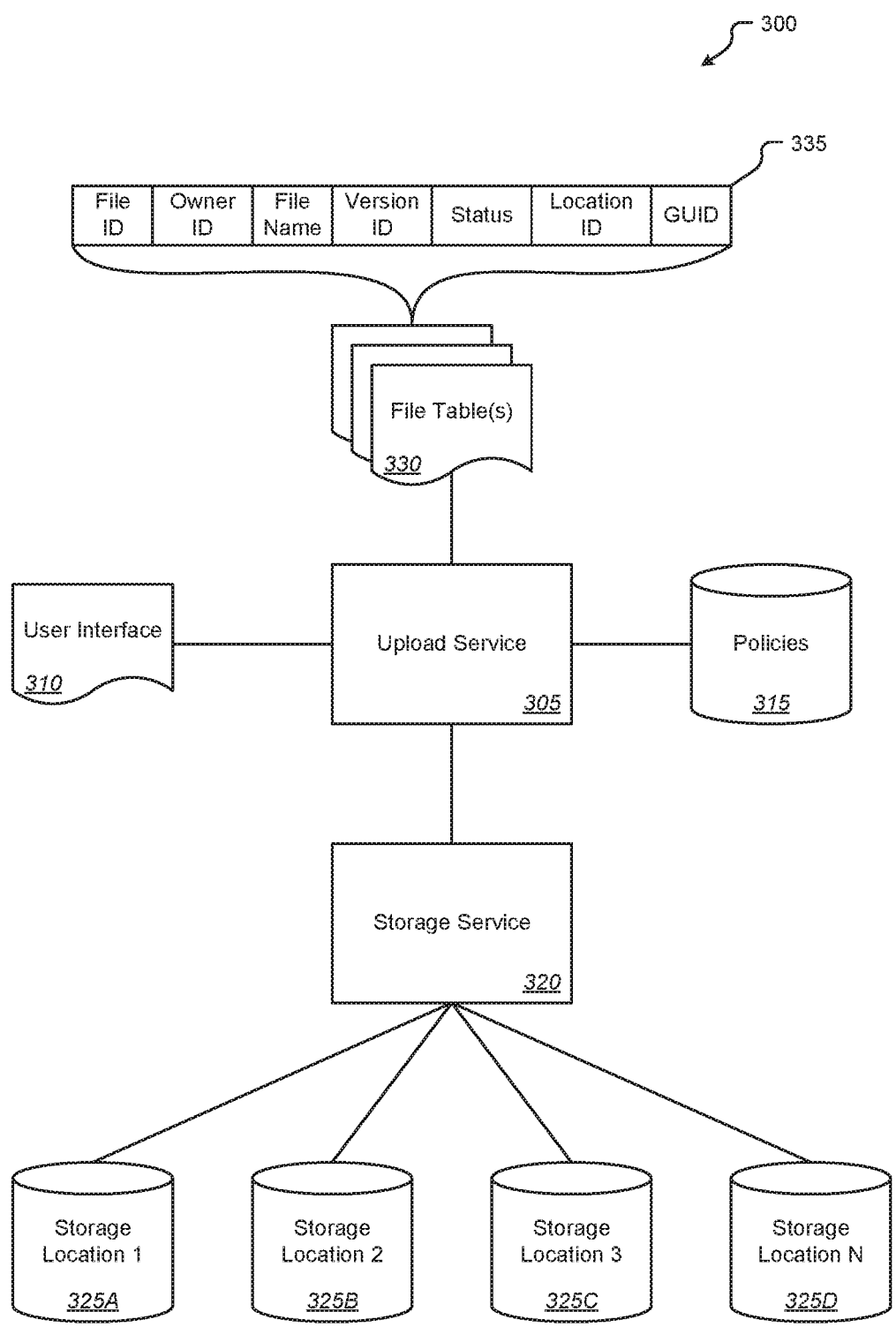
FIG. 3 is a block diagram illustrating elements of an exemplary system in which migration of cloud-based content between storage locations can be performed according to one embodiment.

FIG. 3 is a block diagram illustrating elements of an exemplary system in which migration of cloud-based content between storage locations can be performed according to one embodiment. As illustrated in this example, a system 300 can comprise an upload service 305. The upload service 305 can comprise any one or more servers as described above and can allow users, through a user interface 310, for example, to provide content for storage on the cloud, access and edit that content, share the content with others directly or through a collaboration environment (not shown here), etc.

Generally speaking, the upload service 305 can read and apply one or more policies 315 to direct the storage of content provided to the upload service 305. Each or these policies 315 can comprise, for example, a set of one or more conditions and one or more associated actions to be performed upon those conditions. For example, a policy may define how or where a content item should be stored. In some cases, content may be required to be stored in a particular geographic region or location based upon, for example, the location of the user providing that content, i.e., the content owner. By applying the policies 315, the upload service 305 can direct a storage service 320 to store the uploaded content.

The storage service 320 can comprise one or more servers as described above. Upon receiving the uploaded content, the storage service can save the content to one of a plurality of different storage locations 325A-325D. According to one embodiment, each of these storage locations 325A-325D can be associated with a different region, e.g., a geographic region. For example, one storage location 325A may be in or associated with North America while another storage location 325B can be in or associated with Europe, etc. Based on the conditions and action defined in the policies 315 as applied by the upload service 305, the storage service 320 can direct content to the appropriate storage location 325A-325D for storage.

The system 300 can also maintain a set of file tables 330 related to the files or other organization of data stored at the various storage locations 325A-325D. Each stored file or set of data can be identified in the file tables 330 by a set of parameters defined in a record 335 associated with each stored file or set of data. These parameters can include, but are not limited to, one or more of a file ID uniquely identifying the file, an owner ID uniquely identifying the creator or owner of the file, a file name which may be assigned by the file owner, a file version ID uniquely identifying each revised version of the original file, a location parameter indicating a geographic region or other location for storage of the file, a status indicator identifying a current status of the file such as deleted, for example, and a generated unique identifier for the file. The generated unique identifier can comprise, for example a string or other data generated randomly or in another way and that uniquely identifies the file to the upload service 305 and storage service 320. The generated unique identifier can be mapped to the file ID for the file and can point to the storage location for that file.

As will be described below, the policies 315 can be applied not only when a file is initially provided to the upload service 305 but can also be applied upon a changed condition, e.g., an owner of a file changes to or is assigned to a different region necessitating the migration of files to that region. In this case or in other cases which necessitate migration of files between storage locations 325A-325D, the file tables can be used to facilitate the migration while maintaining the availability of those files during the migration.

Figure 4:
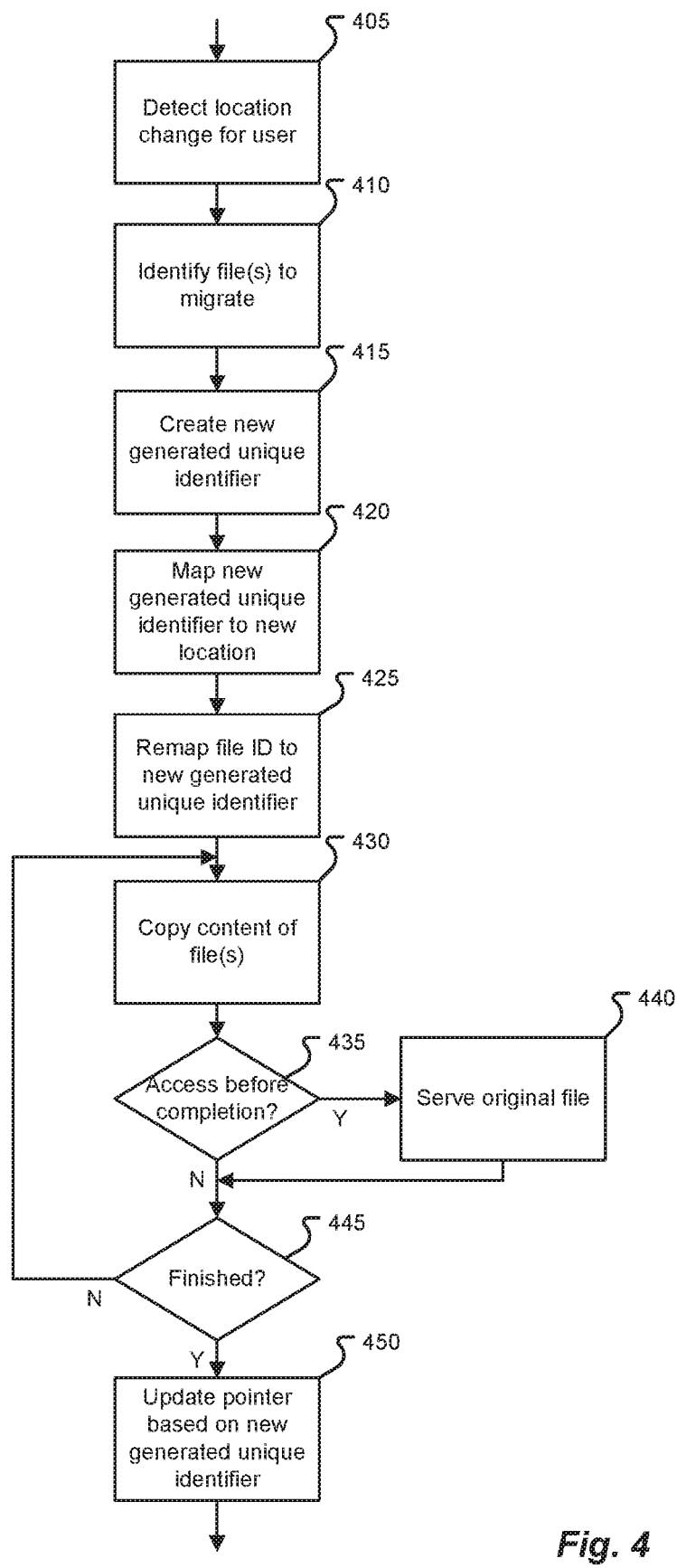
FIG. 4 is a flowchart illustrating an exemplary process for migrating cloud-based content between storage locations according to one embodiment.

FIG. 4 is a flowchart illustrating an exemplary process for migrating cloud-based content between storage locations according to one embodiment. As illustrated in this example, migrating one or more files or other sets of data can begin with detecting 405 a location change for an owner of the file(s)/data or another condition that necessitates migration of the data between storage locations. It should be noted, however, that in other examples, migration can be initiated for other reasons or based on other events or conditions. For example, migration may be initiated due to the owner of the data changing and the new owner being in a particular zone or region. In other cases, migration may be initiated due to new data being created in a particular zone or region. In yet other cases, migration may be initiated due to a policy change that necessitates a change to previous determination of where to store particular data. The files or set of data to be migrated can be identified, e.g., based on the owner ID of records associated with each file and stored in the file tables 330. For each identified file or set of data, a new generated unique identifier can be created 415 and mapped 420 to a new location, i.e., can be made to point to a destination location of the migration for that data. The record of the file tables 330 associated with that set of data, e.g., the file ID for that file, can then be remapped 425 to the newly generated unique identifier pointing to the new location for the file.

Content of the file can then be copied 430 from the origin of the migration to the destination. If, during the migration, access of the file is detected 435, the file can be made available even while migration is ongoing. Specifically, the upload server can access and serve 440, i.e., make available, the original file using the original generated unique identifier which is still pointing to the origin of the data being migrated. Once access has been provided in this way, changes, deletions, copies, and moves of the file can be further handled as will be described below. Copying 430 the data from the origin location to the destination location can continue until a determination 445 is made that copying is complete. At this point, new generated unique identifier can be used to update 450 the record of the file table associated with that data with a pointer to the new location for the file or other content. In some cases, a cleanup or removal of the content from the original location can be performed or scheduled.

Figure 5:
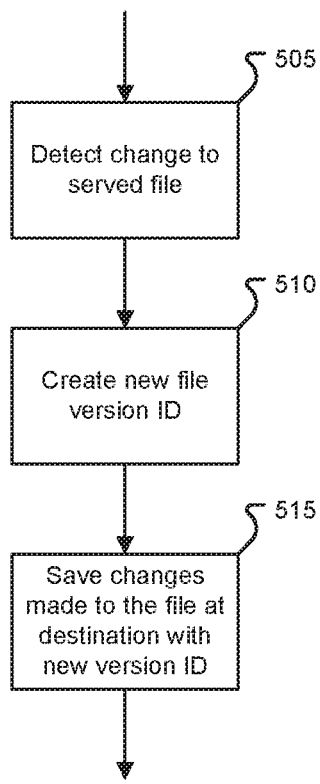
FIG. 5 is a flowchart illustrating an exemplary process for handling a change to a file during migration according to one embodiment.

FIG. 5 is a flowchart illustrating an exemplary process for handling a change to a file during migration according to one embodiment. As illustrated in this example, the process can begin with detecting 505 a change to the data during migration. In response to detecting this change, a new version ID can be created 510. The changes made to the data can then be saved 515, at the destination location for the migration, using the new version ID.

Figure 6:
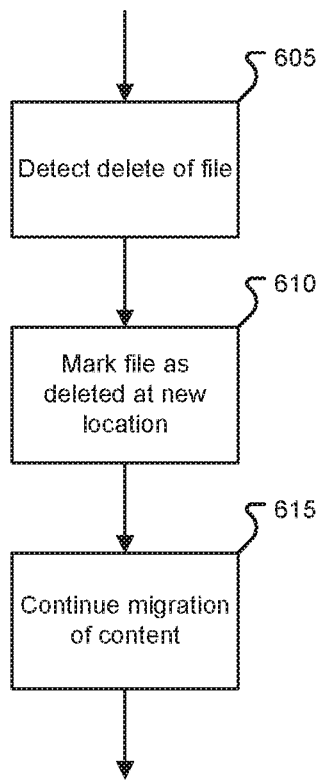
FIG. 6 is a flowchart illustrating an exemplary process for handling a file delete during migration according to one embodiment.

FIG. 6 is a flowchart illustrating an exemplary process for handling a file delete during migration according to one embodiment. As illustrated in this example, the process can begin with detecting 605 a deletion to the data during migration. In response to detecting this deletion, the data can be marked as deleted, i.e., the status of the data in the record of the file table 330 associated with the data can be changed, for the new data at the destination location of the migration. Meanwhile, the migration of the data to the new location can continue 615 even though the data has been marked as deleted. The deletion of the data from the origin location can be scheduled for a later time, e.g., as part of a periodic cleanup or maintenance routine.

Figure 7:
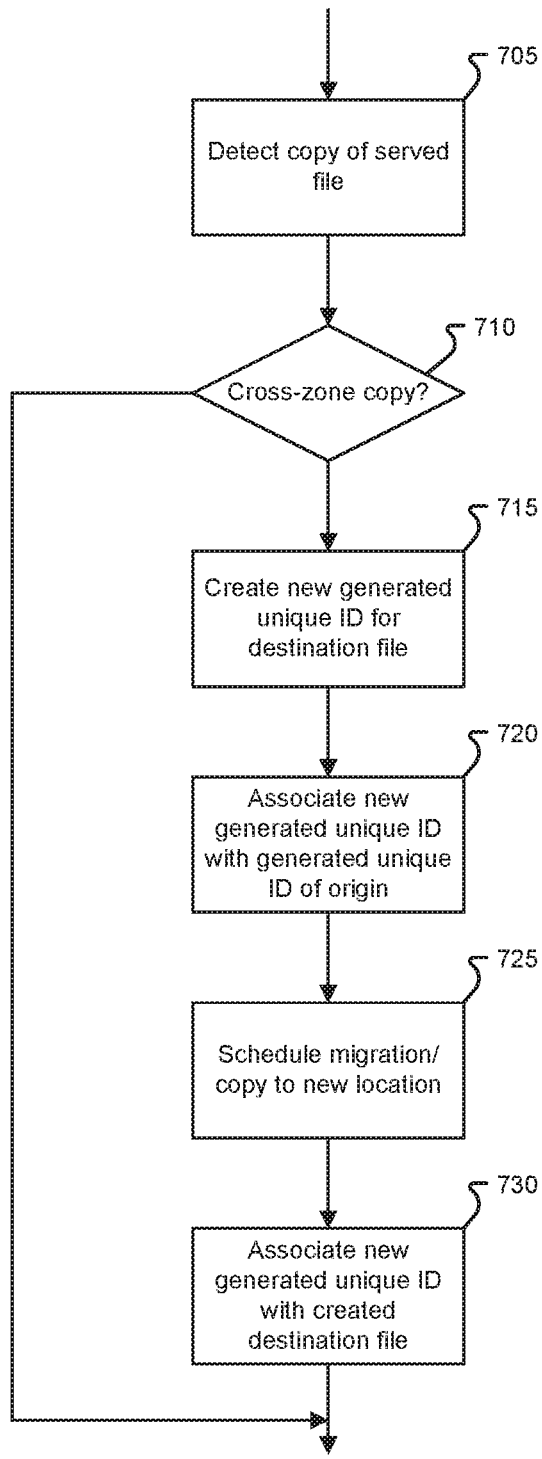
FIG. 7 is a flowchart illustrating an exemplary process for handling a file copy during migration according to one embodiment.

FIG. 7 is a flowchart illustrating an exemplary process for handling a file copy during migration according to one embodiment. As illustrated in this example, the process can begin with detecting 705 a copying of the data during migration. Furthermore, a determination 710 can be made as to whether the copy is a cross-zone copy i.e., from one storage location in one zone or region to another storage location in different zone or region. In response to detecting 705 this copying and determining 710 it is a cross-zone copy operation, a new generated unique identifier can be created 715 for the copy of the data and the new generated unique identifier can be associated with or mapped 720 to a new location, i.e., can be made to point to a destination location of the copy of the data. Migration or copying of the data to the new location can then be scheduled 725, i.e., the destination set of data can be created at a scheduled time, and the generated new unique identifier can be associated with or mapped to 730 the created destination data, i.e., mapped to the file ID of the record associated with that data in the file table.

Figure 8:
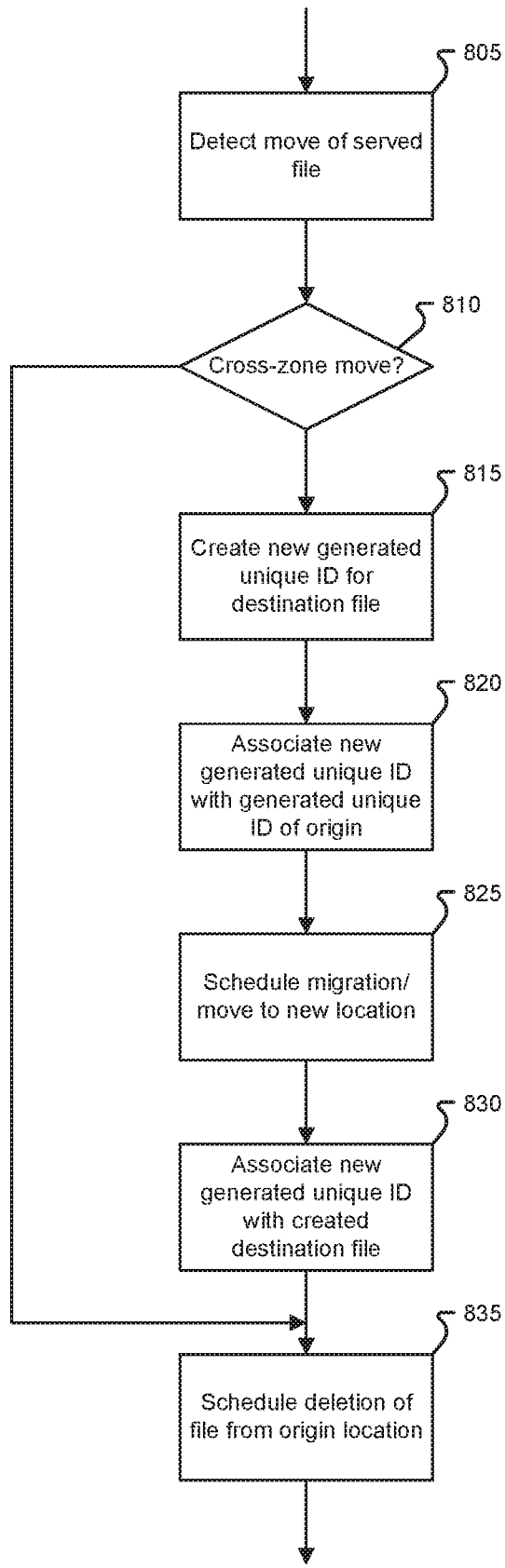
FIG. 8 is a flowchart illustrating an exemplary process for handling a file move during migration according to one embodiment.

FIG. 8 is a flowchart illustrating an exemplary process for handling a file move during migration according to one embodiment. As illustrated in this example, the process can begin with detecting 805 a move of the data during migration. Furthermore, a determination 810 can be made as to whether the move is a cross-zone move i.e., from one storage location in one zone or region to another storage location in different zone or region. In response to detecting 805 this move and determining 810 it is a cross-zone move operation, a new generated unique identifier can be created 815 for the data and the new generated unique identifier can be associated with or mapped 820 to a new location, i.e., can be made to point to a destination location of the data. Migration or moving of the data to the new location can then be scheduled 825, i.e., the destination set of data can be created at a scheduled time, and the generated new unique identifier can be associated with or mapped to 830 the created destination set of data, i.e., mapped to the file ID of the record associated with that data in the file table. The original data at the origin location can then be scheduled 835 for deletion.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for migrating data between a plurality of storage locations, the method comprising:
   detecting, by a processor of a cloud-based storage service, a change in a geographic location of a user of the cloud-based storage service;
   initiating, by the processor of the cloud-based storage service, migration of a set of data from an origin location of the plurality of storage locations to a destination location of the plurality of storage locations, wherein the set of data comprises one or more files owned by the user and wherein the migration is initiated based on the detected change in the geographic location of the user;

identifying, by the processor of the cloud-based storage service, each file in the set of data owned by the user at the origin location using a table, wherein the table comprises a plurality of records, each record of the plurality of records corresponding to a file stored in a storage location of the plurality of storage locations, wherein each record comprises a field storing an owner identifier (ID) for the corresponding file, a field storing a unique identifier for the corresponding file which is mapped to a file identifier for the file and points to the origin location for the file, and a field storing a location ID indicating a geographic region in which the file is stored, and wherein identifying each file of the one or more files in the set of data owned by the user at the origin location comprises identifying each record of the table storing the owner ID of the user;

creating, by the processor of the cloud-based storage service, a generated unique identifier for each file in the set of data at the origin location of the plurality of storage locations, the generated unique identifier associated with a pointer to the destination location;

mapping, by the processor of the cloud-based storage service, the generated unique identifier for each file in the set of data at the origin location to the destination location;

updating, by the processor of the cloud-based storage service, the record corresponding to each file in the set of data at the origin location, wherein updating the record corresponding to each file in the set of data at the origin location comprises replacing the unique identifier in the record for the corresponding file with the generated unique identifier by storing the generated unique identifier in the field of the record storing the unique identifier for the corresponding file; and copying, by the processor of the cloud-based storage service, the set of data from the origin location to the destination location, while maintaining availability of the set of data at the origin location by the cloud-based storage service.

2. The method of claim 1, further comprising:

detecting, by the processor of the cloud-based storage service, during the migration, access of the set of data at the origin location; and making the set of data at the origin location available, by the processor of the cloud-based storage service, while migration is ongoing using the generated unique identifier and updated record corresponding to each file in the set of data at the origin location and which still points to the origin location of the set of data at the origin location.

3. The method of claim 2, further comprising, upon completion of copying the set of data from the origin location to the destination location, updating the record corresponding to each file in the set of data at the origin location and stored in the table to point to the set of data at the destination location based on the pointer to the destination location associated with the generated unique identifier and updating the location ID field of the record corresponding to each file.

4. The method of claim 1, further comprising detecting, by the processor of the cloud-based storage service, a change to the set of data at the origin location during migration and in response to detecting the change:

creating, by the processor of the cloud-based storage service, a new version ID for the set of data at the origin location in the record corresponding to each file in the set of data at the origin location and stored in the table; and saving, by the processor of the cloud-based storage service, changes made to the set of data at the origin location to the set of data at the destination location for the migration using the new version ID.

5. The method of claim 1, further comprising detecting, by the processor of the cloud-based storage service, a deletion of the set of data at the origin location during migration and in response to detecting the deletion:

changing, by the processor of the cloud-based storage service, a status of the set of data at the origin location in the record corresponding to each file in the set of data at the origin location and stored in the table; and continuing, by the processor of the cloud-based storage service, the migration of the content of the set of data from the origin location to the destination location.

6. The method of claim 1, further comprising detecting, by the processor of the cloud-based storage service, a copying of the set of data at the origin location during migration and in response to detecting the copying:

creating, by the processor of the cloud-based storage service, a new generated unique identifier for each file in the copy of the set of data at the origin location;

mapping, by the processor of the cloud-based storage service, the new generated unique identifier to point to a destination location for each file in the copy of the set of data at the origin location;

creating, by the processor of the cloud-based storage service, a destination set of data at the destination location of the copy of the set of data at the origin location using the set of data at the origin location; and mapping, by the processor of the cloud-based storage service, the generated new unique identifier for each file in the copy of the set of data at the origin location to a corresponding record stored in the table.

7. The method of claim 1, further comprising detecting, by the processor of the cloud-based storage service, a move of the set of data at the origin location during migration and in response to detecting the move:

creating, by the processor of the cloud-based storage service, a new generated unique identifier for the move of each file in the set of data at the origin location;

mapping, by the processor of the cloud-based storage service, the new generated unique identifier to point to a destination location of the move of each file the set of data at the origin location;

creating, by the processor of the cloud-based storage service, a destination set of data at the destination location using the set of data at the origin location;

mapping, by the processor of the cloud-based storage service, the generated new unique identifier for the move of each file in the set of data at the origin location to a corresponding record stored in the table; and deleting, by the processor of the cloud-based storage service, the set of data at the origin location.

8. A system comprising:

a processor; and a memory coupled with and readable by the processor and storing therein a set of instructions which, when executed by the processor, causes the processor to migrate data between a plurality of storage locations by:

detecting a change in a geographic location of a user of the cloud-based storage service;

initiating migration of a set of data from an origin location of the plurality of storage locations to a destination location of the plurality of storage locations, wherein the set of data comprises one or more files owned by the user and wherein the migration is initiated based on the detected change in the geographic location of the user;

identifying each file in the set of data owned by the user at the origin location using a table, wherein the table comprises a plurality of records, each record of the plurality of records corresponding to a file stored in a storage location of the plurality of storage locations, wherein each record comprises a field storing an identifier (ID) for the corresponding file, a field storing a unique identifier for the corresponding file which is mapped to a file identifier for the file and points to the origin location for the file, and a field storing a location ID indicating a geographic region in which the file is stored, and wherein identifying each file of the one or more files in the set of data owned by the user at the origin location comprises identifying each record of the table storing the owner ID of the user;

creating a generated unique identifier for each file in the set of data at the origin location, the generated unique identifier associated with a pointer to the destination location;

mapping the generated unique identifier for each file in the set of data at the origin location to the destination location;

updating the record corresponding to each file in the set of data at the origin location, wherein updating the record corresponding to each file in the set of data at the origin location comprises replacing the unique identifier in the record for the corresponding file with the generated unique identifier by storing the generated unique identifier in the field of the record storing the unique identifier for the corresponding file; and copying the set of data from the origin location to the destination location, while maintaining availability of the set of data at the origin location by the cloud-based storage service.

9. The system of claim 8, wherein the instructions further cause the processor to:
detect during the migration, access of the set of data at the origin location; and
make the set of data at the origin location available while migration is ongoing using the generated unique identifier and updated record corresponding to each file in the set of data at the origin location and which still points to the origin location of the set of data at the origin location.

10. The system of claim 9, wherein the instructions further comprise the processor to, upon completion of copying the set of data from the origin location to the destination location, update the record corresponding to each file in the set of data at the origin location and stored in the table to point to the set of data at the destination location based on the pointer to the destination location associated with the generated unique identifier and update the location ID field of the record corresponding to each file.

11. The system of claim 8, wherein the instructions further cause the processor to detect a change to the set of data at the origin location during migration and in response to detecting the change:
create a new version ID for the set of data at the origin location in the record corresponding to each file in the set of data at the origin location and stored in the table; and
save changes made to the set of data at the origin location to the set of data at the destination location for the migration using the new version ID.

12. The system of claim 8, wherein the instructions further cause the processor to detect a deletion of the set of data at the origin location during migration and in response to detecting the deletion:
change a status of the set of data at the origin location in the record corresponding to each file in the set of data at the origin location and stored in the table; and
continue the migration of the content of the set of data from the origin location to the destination location.

13. The system of claim 8, wherein the instructions further cause the processor to detect a copying of the set of data at the origin location during migration and in response to detecting the copying:
create a new generated unique identifier for each file in the copy of the set of data at the origin location;
map the new generated unique identifier to point to a destination location for each file in the copy of the set of data at the origin location;
create a destination set of data at the destination location of the copy of the set of data at the origin location using the set of data at the origin location; and
map the generated new unique identifier for each file in the copy of the set of data at the origin location to a corresponding record stored in the table.

14. The system of claim 8, wherein the instructions further cause the processor to detect a move of the set of data at the origin location during migration and in response to detecting the move:
create a new generated unique identifier for the move of each file in the set of data at the origin location;
map the new generated unique identifier to point to a destination location of the move of each file the set of data at the origin location;
create a destination set of data at the destination location using the set of data at the origin location;
map the generated new unique identifier for the move of each file in the set of data at the origin location to a corresponding record stored in the table; and
delete the set of data at the origin location.

15. A non-transitory, computer-readable medium comprising a set of instructions stored therein which, when executed by a processor, causes the processor to migrate data between a plurality of storage locations by:
detecting a change in a geographic location of a user of the cloud-based storage service;
initiating migration of a set of data from an origin location of the plurality of storage locations to a destination location of the plurality of storage locations, wherein the set of data comprises one or more files owned by the user and wherein the migration is initiated based on the detected change in the geographic location of the user;
identifying each file in the set of data owned by the user at the origin location using a table, wherein the table comprises a plurality of records, each record of the plurality of records corresponding to a file stored in a storage location of the plurality of storage locations, wherein each record comprises a field storing an identifier (ID) for the corresponding file, a field storing a unique identifier for the corresponding file which is mapped to a file identifier for the file and points to the origin location for the file, and a field storing a location ID indicating a geographic region in which the file is stored, and wherein identifying each file of the one or more files in the set of data owned by the user at the origin location comprises identifying each record of the table storing the owner ID of the user;

creating a generated unique identifier for each file in the set of data at the origin location, the generated unique identifier associated with a pointer to the destination location;

mapping the generated unique identifier for each file in the set of data at the origin location to the destination location;

updating the record corresponding to each file in the set of data at the origin location, wherein updating the record corresponding to each file in the set of data at the origin location comprises replacing the unique identifier in the record for the corresponding file with the generated unique identifier by storing the generated unique identifier in the field of the record storing the unique identifier for the corresponding file; and copying the set of data from the origin location to the destination location, while maintaining availability of the set of data at the origin location by the cloud-based storage service.

16. The non-transitory, computer-readable medium of claim 15, wherein the instructions further cause the processor to:
detect during the migration, access of the set of data at the origin location; and
make the set of data at the origin location available while migration is ongoing using the generated unique identifier and updated record corresponding to each file the set of data at the origin location and which still points to the origin location of the set of data at the origin location; and
upon completion of copying the set of data from the origin location to the destination location, update the record corresponding to each file the set of data at the origin location and stored in the table to point to the set of data at the destination location based on the pointer to the destination location associated with the generated unique identifier.

17. The non-transitory, computer-readable medium of claim 15, wherein the instructions further cause the processor to detect a change to the set of data at the origin location during migration and in response to detecting the change:
create a new version ID for the set of data at the origin location in the record corresponding to each file the set of data at the origin location and stored in the table; and
save changes made to the set of data at the origin location at the destination location for the migration using the new version ID.

18. The non-transitory, computer-readable medium of claim 15, wherein the instructions further cause the processor to detect a deletion of the set of data at the origin location during migration and in response to detecting the deletion:
change a status of the set of data at the origin location in the record corresponding to each file the set of data at the origin location and stored in the table; and
continue the migration of the content of the set of data from the origin location to the destination location.

19. The non-transitory, computer-readable medium of claim 15, wherein the instructions further cause the processor to detect a copying of the set of data at the origin location during migration and in response to detecting the copying:
create a new generated unique identifier for each file in the copy of the set of data at the origin location;
map the new generated unique identifier to point to a destination location for each file in the copy of the set of data at the origin location;
create a destination set of data at the destination location of the copy of the set of data at the origin location using the set of data at the origin location; and
map the generated new unique identifier for each file in the copy of the set of data at the origin location to a corresponding record stored in the table.

20. The non-transitory, computer-readable medium of claim 15, wherein the instructions further cause the processor to detect a move of the set of data at the origin location during migration and in response to detecting the move:
create a new generated unique identifier for the move of each file in the set of data at the origin location;
map the new generated unique identifier to point to a destination location of the move of each file the set of data at the origin location;
create a destination set of data at the destination location using the set of data at the origin location;
map the generated new unique identifier for the move of each file in the set of data at the origin location to a corresponding record stored in the table; and
delete the set of data at the origin location.

* * * * *